Jan. 24, 1939. E. A. MITCHELL 2,145,092
HIGH TENSION ELECTRIC CABLE
Filed Sept. 24, 1935
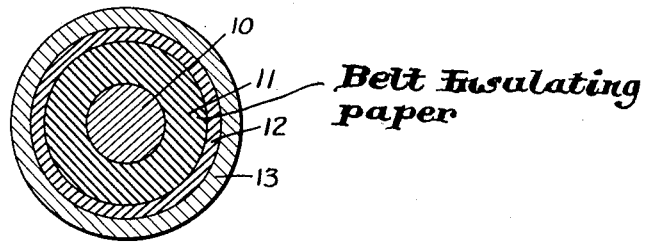
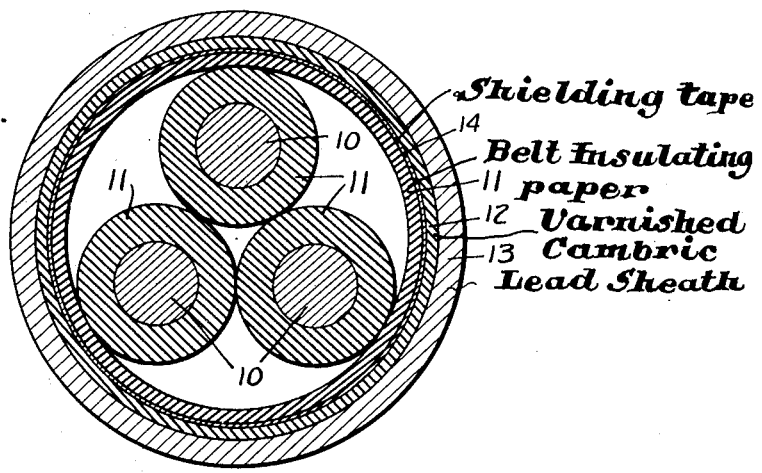
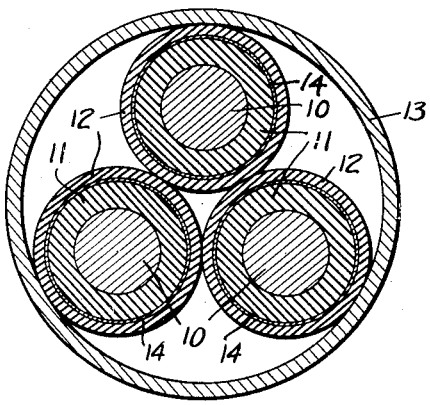
INVENTOR
Earle A. Mitchell
ATTORNEY Patented Jan. 24, 1939

2,145,092

UNITED STATES PATENT OFFICE 2,145,092

HIGH TENSION ELECTRIC CABLE

Earle A. Mitchell, Hastings on Hudson, N. Y., assignor to Phelps Dodge Copper Products Corporation, New York, N. Y., a corporation of Delaware Application September 24, 1935, Serial No. 41,852

2 Claims. (Cl. 173—266)

My invention relates to electric cables of the high tension type and more particularly to an electric cable comprising one or more conductors surrounded by fibrous or absorbent insulating material which is impregnated with oil or grease and surrounded by a layer of oil-resistant material.

Fibrous insulating material, such as paper impregnated with oil, suffers from the defect that its oil expands out of the fibrous material when the cable is heated and does not necessarily return when the cable is cooled. Such cables usually have a lead sheath and the effect of expansion of the oil is to stretch the lead and create a space between the insulation and the lead where the oil can stay or through which it can migrate to lower parts of the cable.

My present invention has for its object the production of a cable that will preserve the oil from escaping during periods of thermal expansion.

In my invention the fibrous or absorptive insulating material such as paper, is impregnated with oil or grease and enclosed in several layers of tightly wound varnished cambric. When the oil expands it presses against the interior of the cambric, closing the passages between the turns and causing the cambric to stretch elastically. As the cable cools the interior pressure is reduced and the cambric contracts. In this way I have found that it is possible to operate impregnated paper cables through considerably higher cycles of temperature than has hitherto been believed possible and have found that such cables may be operated on vertical runs or in hilly terrain, without migration of oil.

To facilitate disclosure and explanation of my novel construction, I shall refer to three of the simpler forms of cable to which it may be applied and shall disclose what I now consider the preferred manner in which the invention should be put into practice.

Referring to the drawing,

Figure 1 is a cross-sectional view of a single-conductor cable.

Figure 2 is a cross-sectional view of a three-conductor cable.

Figure 3 is a cross-sectional view of a three-conductor cable with modified covering.

Referring to these figures, the electrical conductor 10, commonly composed of stranded copper wires, is wrapped with helically wound tapes 11 of paper or other fibrous or absorbent insulating material, impregnated with oil or other saturating compound. Over this is applied a tightly wound belt of varnished cambric 12, consisting of several layers. Finally, the cable is covered with the usual lead sheath 13.

In the case of three-conductor cables, the varnished cambric may be applied either as an overall belt, as in Figure 2, or each conductor may be separately covered with varnished cambric, as in Figure 3. When the cable is of the shielded type, the shield 14, which may be of sheet copper or metalized tape, is placed under the cambric for high voltage cables, otherwise such shield may be intercalated with the last layer of varnished cambric.

In place of varnished cambric, any oil-proof, elastic material may be used.

In place of a lead sheath, a sheath of fabric saturated with rubber, Duprene, or other suitable material, may be used.

The invention also applies to cables in which the sheath is covered with armoring, either of bands or wires.

I wish it distinctly understood that my high tension electric cable herein described is in the form in which I desire to make it and that changes or variations may be made as may be desirable or convenient without departing from the salient features of my invention and I therefore intend the following claims to cover such modifications as naturally fall within the lines of invention.

I claim:

1. An electric cable comprising a conductor, provided with an insulation entirely of impregnated paper, an electric shield over the insulation, a wall of elastic varnished cambric over the shield and formed to resist the expansion of the insulation when the cable is heated under load, and to restore the insulation to its original form upon cooling of the cable, and a sheath over all.

2. An electric cable comprising a plurality of conductors, each individually covered with insulation entirely of impregnated fibrous material, a belt of paper insulation embracing the three insulated conductors, an electric shield over the belt, a wall of elastic varnished cambric over the shield formed to resist the expansion of the insulation when the cable is heated under load and to restore the insulation to its original form upon cooling of the cable.

EARLE A. MITCHELL.